Feb. 24, 1959　　　G. L. HERSHMAN　　　2,874,789
DRAFT CONTROL APPARATUS INDICATORS FOR IMPLEMENTS
Filed April 10, 1957　　　7 Sheets-Sheet 4

Inventor:
Gordon L. Hershman

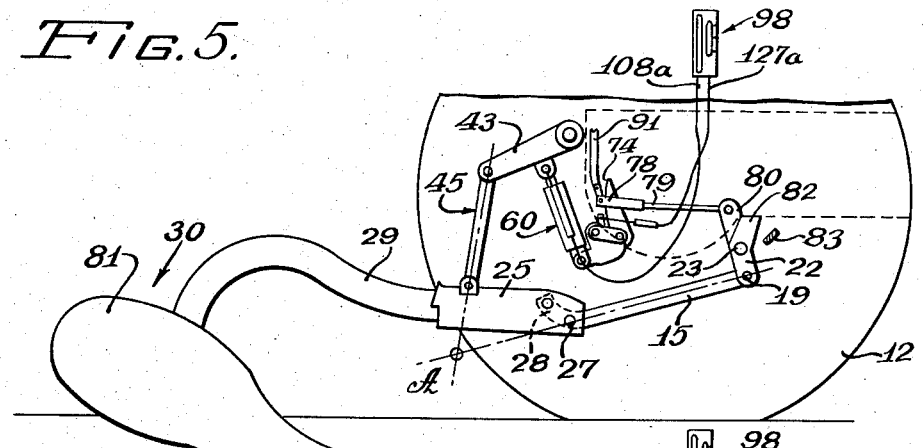
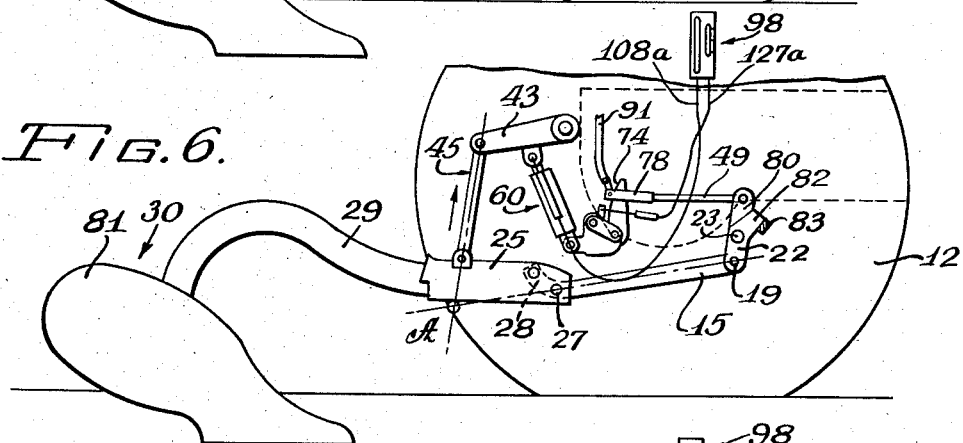
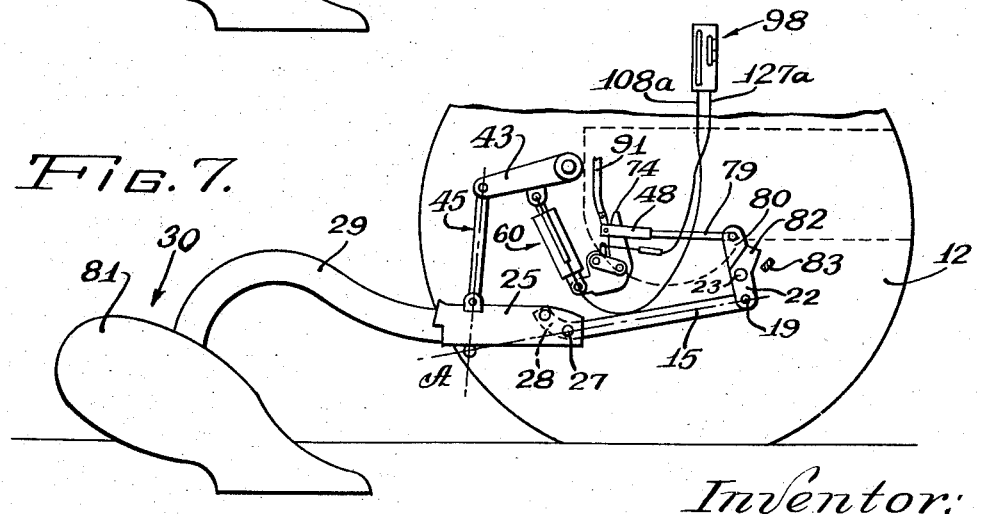

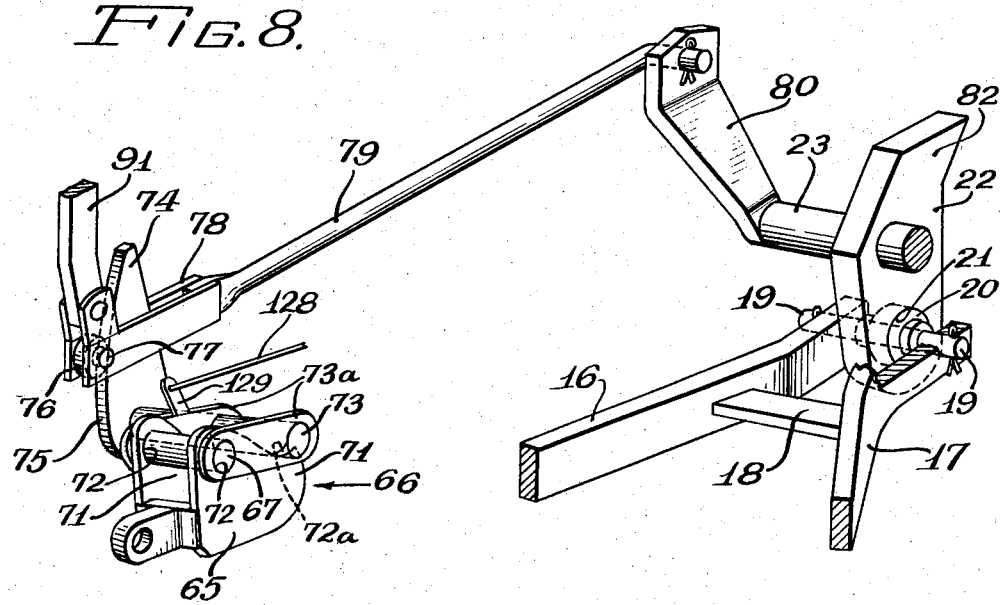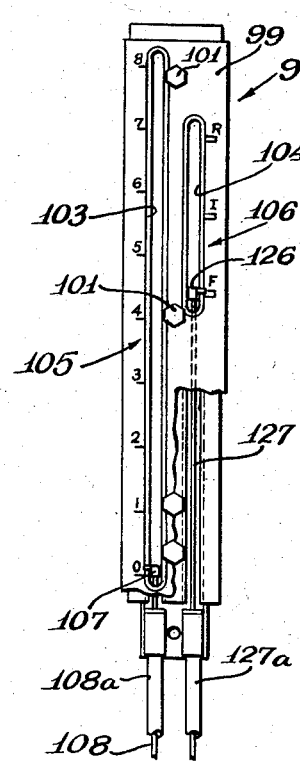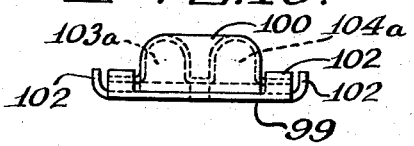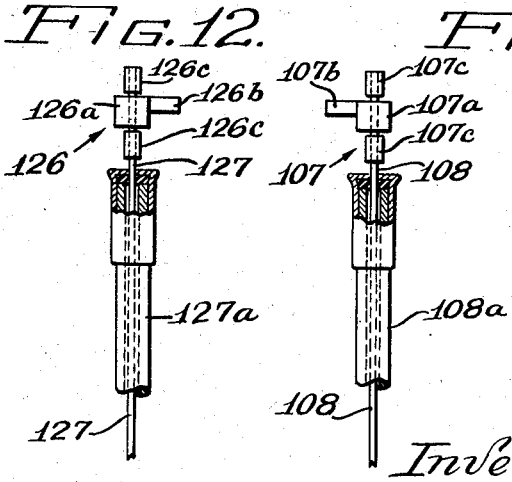

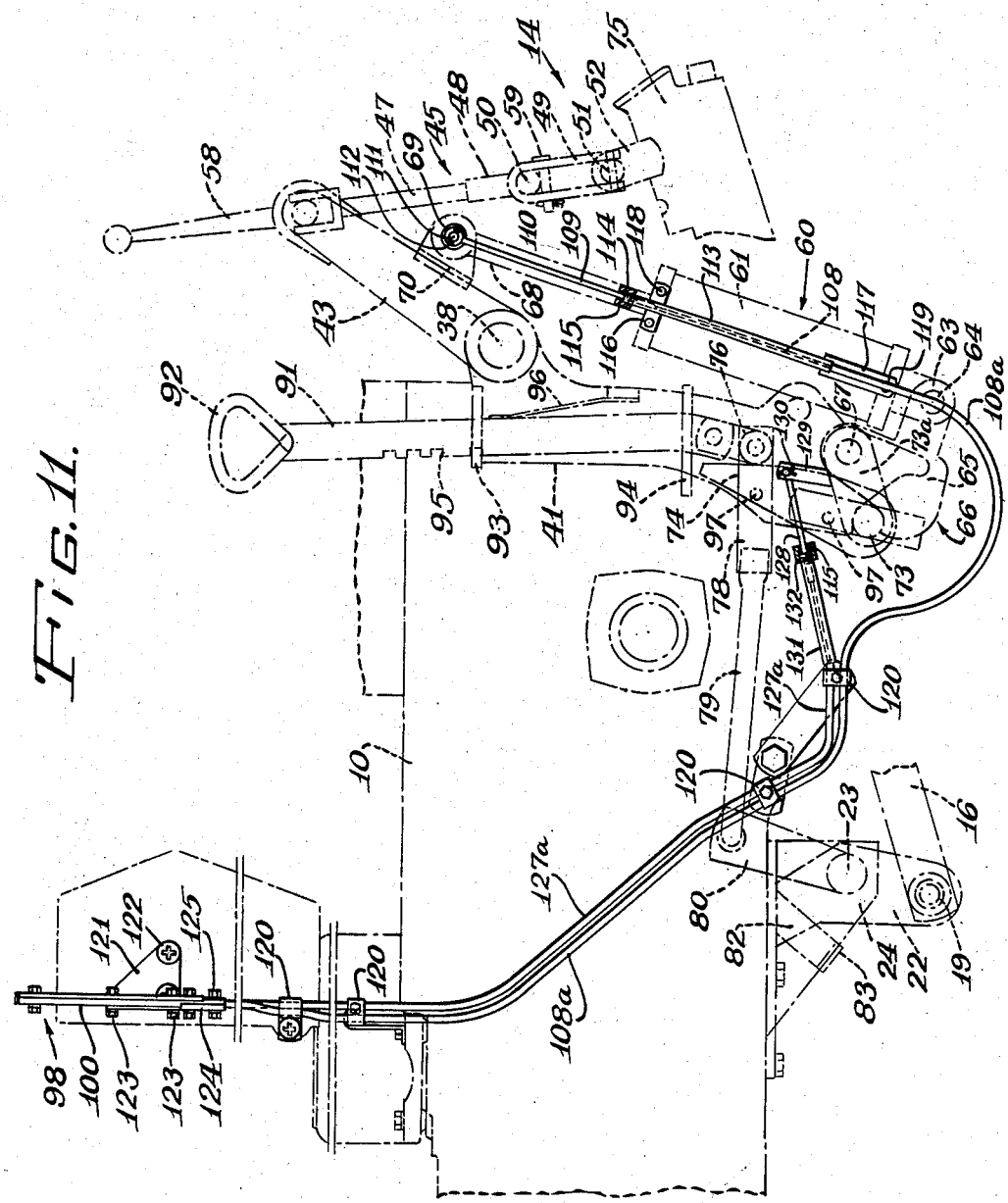

United States Patent Office 2,874,789
Patented Feb. 24, 1959

2,874,789

DRAFT CONTROL APPARATUS INDICATORS FOR IMPLEMENTS

Gordon L. Hershman, Chicago, Ill., assignor to International Harvester Company, Chicago, Ill., a corporation of New Jersey Application April 10, 1957, Serial No. 652,057

4 Claims. (Cl. 172—239)

This invention relates generally to agricultural implement attaching apparatus adapted for attaching earthworking implements to a tractive vehicle such as a tractor, and somewhat more particularly is concerned with tractor mounting implement means wherein the implement is carried by the tractor, and wherein means are provided for utilizing the draft forces acting upon the implement to maintain uniform operation of the earthworking tools in the ground. More specifically, however, the invention is directed to the novel indicating apparatus, utilized with the particular implement attaching apparatus envisaged, to provide the vehicle operator with visual means for readily and easily determining and locating the operating positions of the attached implement and of certain parts of said attaching apparatus. The invention is particularly applicable to weight transfer or draft control and implement attaching apparatus for tractors, such as that disclosed in copending U. S. application Serial No. 614,110 filed October 5, 1956 and U. S. application Serial No. 614,305 filed October 5, 1956, to which reference may be had for constructional details forming only environment for the invention as claimed herein.

An important object of the present invention contemplates the provision of visual manifesting means to indicate the depth at which the implement is being operated in the ground, and to indicate the relative amount of draft forces acting on the implement that are being transmitted through the implement attaching apparatus to the tractor under various operating conditions.

Another object is to provide visual means for indicating to the vehicle pilot or operator whether or not a balance is being maintained between the effective weight of an attached implement and the draft forces encountered thereby.

A further object is to provide a combined indicating device wherein the depth at which the implement is being operated in the ground is indicated simultaneously with the manifestations of the balance being maintained between the effective weight of said implement and the draft forces encountered thereby.

A still further object is to provide indicating means which are operative to indicate the balance being maintained between the effective weight of the implement and the draft forces encountered thereby regardless of the amount of the draft forces acting on the implement that are being transmitted through the implement attaching apparatus to the tractor.

A yet still further object is to provide indicating means for translating the longitudinal movements relative to the propelling vehicle of an attached implement, resulting from draft forces encountered thereby, into visual manifestations readily viewable by the pilot or operator of the vehicle to which said implement is attached.

The foregoing and other objects and features of the invention will become apparent as the disclosure is more fully made in the following detailed description of a preferred embodiment of the invention as illustrated in the accompanying sheets of drawings in which:

Figure 5 is a diagrammatic view of a moldboard plow in operation and showing the implement attaching and draft control apparatus together with the draft control indicator in a position corresponding with the lowermost position thereof;

Figure 6 is a view similar to Figure 5 showing the implement attaching and draft control apparatus together with the draft control indicator in a position corresponding with the uppermost position thereof;

Figure 7 is a view similar to Figures 5 and 6 showing the implement attaching and draft control and indicator apparatus in another position intermediate the uppermost and lowermost positions thereof;

Figure 8 is an enlarged perspective detail, with parts removed, of a portion of the draft control and weight transfer mechanism;

Figure 9 is a front elevational view of the proposed combination depth and draft indicator control gauge;

Figure 10 is a top plan view of the proposed indicator device;

Figure 11 is a side elevational view, similar to Figure 2, incorporating the present invention and showing the implement attaching and draft control mechanism and the tractor in broken lines while the indicator mechanism is shown in solid lines;

Figure 12 is a fragmentary front elevational view, partially in section, of one of the pointer devices incorporated in the proposed indicator; and Figure 13 is a view similar to Figure 12 showing the other pointer device utilized in the proposed indicator.

Figure 1:
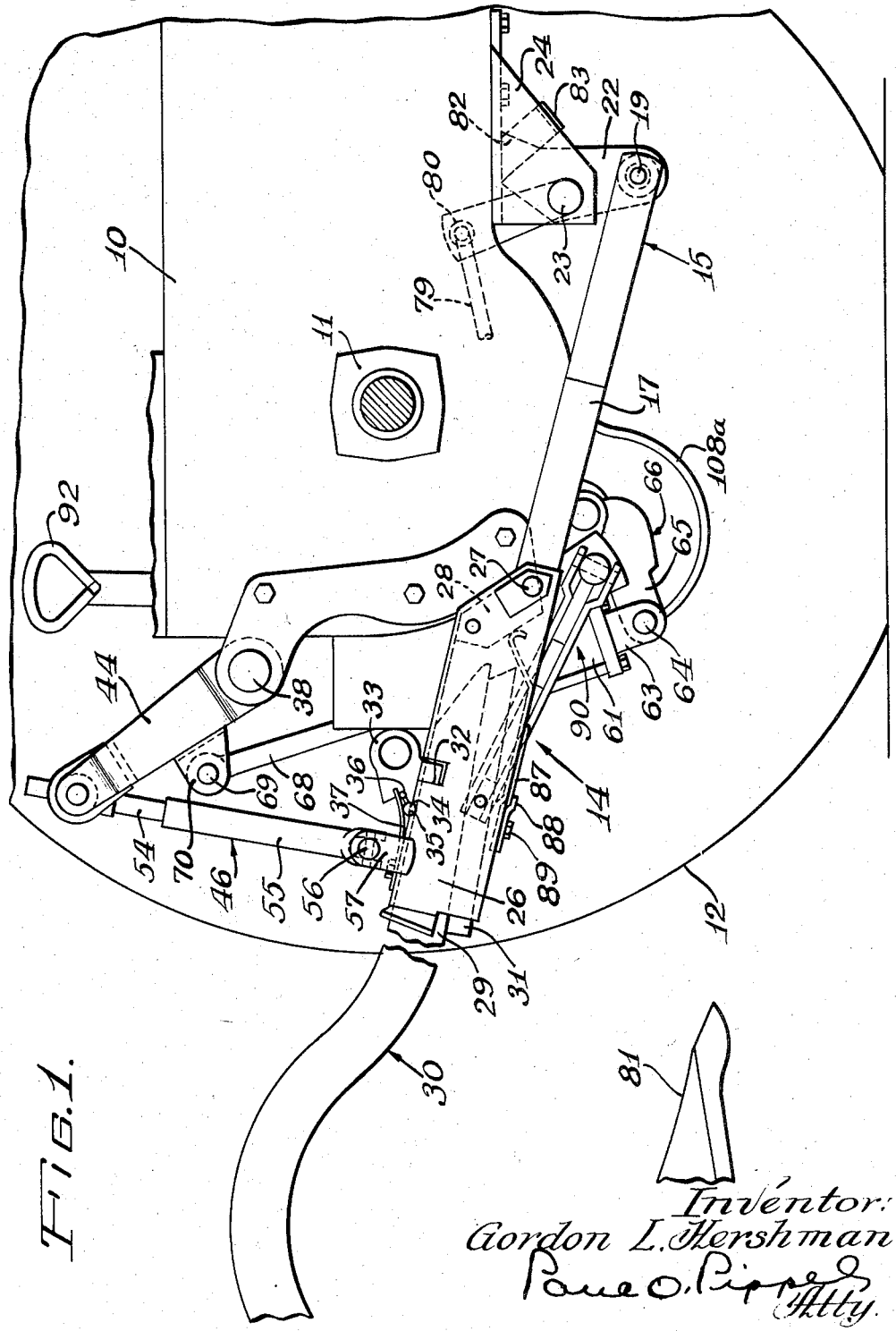
Figure 1 is a view in side elevation of the rear end of a tractor, with one wheel removed, showing implement attaching apparatus and draft control mechanism incorporating features of the present invention and having a moldboard plow connected thereto, the implement and its attaching apparatus being shown in a position corresponding to the transport position of the implement.

Referring now to the drawings, it will be noted that the implement attaching apparatus selected for depicting a preferred application of an arrangement incorporating the present invention is shown associated with a tractor having a generally conventional longitudinally extending body 10, rear axle structure 11 and laterally spaced rear device wheels 12 and 13.

An articulated draft member or drawbar 14, includes a forward bail-like section 15 having laterally spaced forwardly converging arms 16 and 17 connected by a cross brace 18.

The forwardmost ends of arms 16 and 17 which may be parallel are apertured to receive pins 19 projecting from opposite sides of a ball 20 universally pivoted in a socket 21 formed in the lower end of a hitch arm 22 and affixed, as by welding, to a transverse shaft 23, in turn, rotatably supported at opposite ends thereof in a bracket 24 affixed to the body 10 of the tractor and projecting downwardly therefrom. The drawbar or draft member 14 is thus connected in draft-receiving relation to the tractor through hitch arm 22, and by means accommodating longitudinal movement of the draft member, by virtue of the fact that the shaft 23 is rotatably carried between the legs of bracket 24, causing arm 22 to swing about the axis thereof in a longitudinal direction.

Draft member 14 additionally includes an articulated rear section in the form of laterally spaced longitudinally elongated socket members 25 and 26 pivotally connected by transversely extending pivot pins 27 to arms 16 and 17, respectively. The rear end of each of the arms 16 and 17 may be bent upwardly to form an extension, such as 28, that functions as a stop by engaging the upper portion of the socket member associated therewith to limit the downward swing about the axis of the pins 27 of the socket member with respect to the bail.

The socket members 25 and 26 are adapted to slidably receive the laterally spaced complementary longitudinally elongated shafts 29, only one of which shafts is shown, of an earth-working implement, such as the moldboard plow indicated generally by the reference numeral 30, and each of said sockets is provided with a base in the form of a bar 31 affixed thereto which terminates short of the forward end of the associated socket member and forms a support for the lower surface of said shaft member. The forward end of each of the shafts 29 is usually tapered and beveled (see Fig. 1) while the base 31 extends forwardly and upwardly from the rear end of said socket member to conform to the taper of the lower surface of shaft 29, and both said base and shaft terminate short of the forward end of said socket member to avoid engagement with extension 28 of the forward bail section 15.

Each of said socket members may be notched as indicated at 32 to register with a complementary groove or notch (not shown) in each of the shafts 29 while a latch 33 is also provided. As shown (Figure 1) the shafts 29 are in locked position and thus constrained against longitudinal displacement in the respective sockets and the implement 30 is positioned so that its entire weight is supported on the tractor, such as in the transport position of the implement.

Latch member 33 has laterally projecting trunnions 34 rockably received in a groove 35 in the associated socket member and secured thereto are projections 36 engaged by a leaf spring 37 fixed to said socket member and operative to hold said latch in a locking position. To release the latch it is simply rocked rearwardly about the axis of the trunnions 34.

Vertical movement of the draft member 14 may be accomplished by lift means mounted on the tractor and such means includes a transversely extending rockshaft 38 rotatably mounted in bearings 39 and 40 at the upper ends of brackets 41 and 42 affixed to opposite sides of the tractor body. Lift arms 43 and 44 which are affixed to opposite ends of shaft 38 and extend rearwardly therefrom are bifurcated for pivotal connection to the upper ends of a pair of lift links 45 and 46. Left-hand link 45 comprises a shaft portion 47 slidably receivable in a sleeve member 48 having a lower clevis portion 49 providing a slot for the sliding reception of a cross-head 50 on the lower end of shaft 47 to prevent its displacement from sleeve 48 while accommodating sliding movement thereof in said clevis. The lower end of clevis 49 is mounted upon a pivot pin 51 carried by a pair of lugs 52 affixed to and projecting upward from a respective socket member 25.

Lift arm 44 is pivotally connected by its bifurcation to a swivel 53 in which is rotatably received a rod 54 threaded for reception in a sleeve 55, the lower end of which is pivotally mounted upon a pin 56 carried between a pair of upwardly projecting lugs 57 affixed to socket 26. Suitable collars may be provided on rod 54 above and below said swivel, while the lower collar may, if desired, be adjusted downwardly on the rod to accommodate limited telescoping action between said rod and swivel. At the upper end of rod 54 there is provided a handle 58 for adjusting the length of the lifting link 46 thereby laterally levelling the draft member 14 about a longitudinal axis to effect levelling of the attached implement and adjusting the relative vertical positions of the socket members 25 and 26. When certain types of implements are mounted on the tractor it is desirable that the draft structure 14 be allowed to float freely in a vertical plane about the axis of the ball and socket connection 20 and 21, and this may be accomplished through telescoping of links 45 and 54. However, in the case of a moldboard plow such as that illustrated herein it is desirable that it be held against tilting about a longitudinal axis so that the levelling adjustment selected can be maintained, and this is accomplished by means of a pin 59 passed through a suitable opening provided in clevis 49 and adapted to engage the lower lower surface of cross-head 50.

Figure 2:
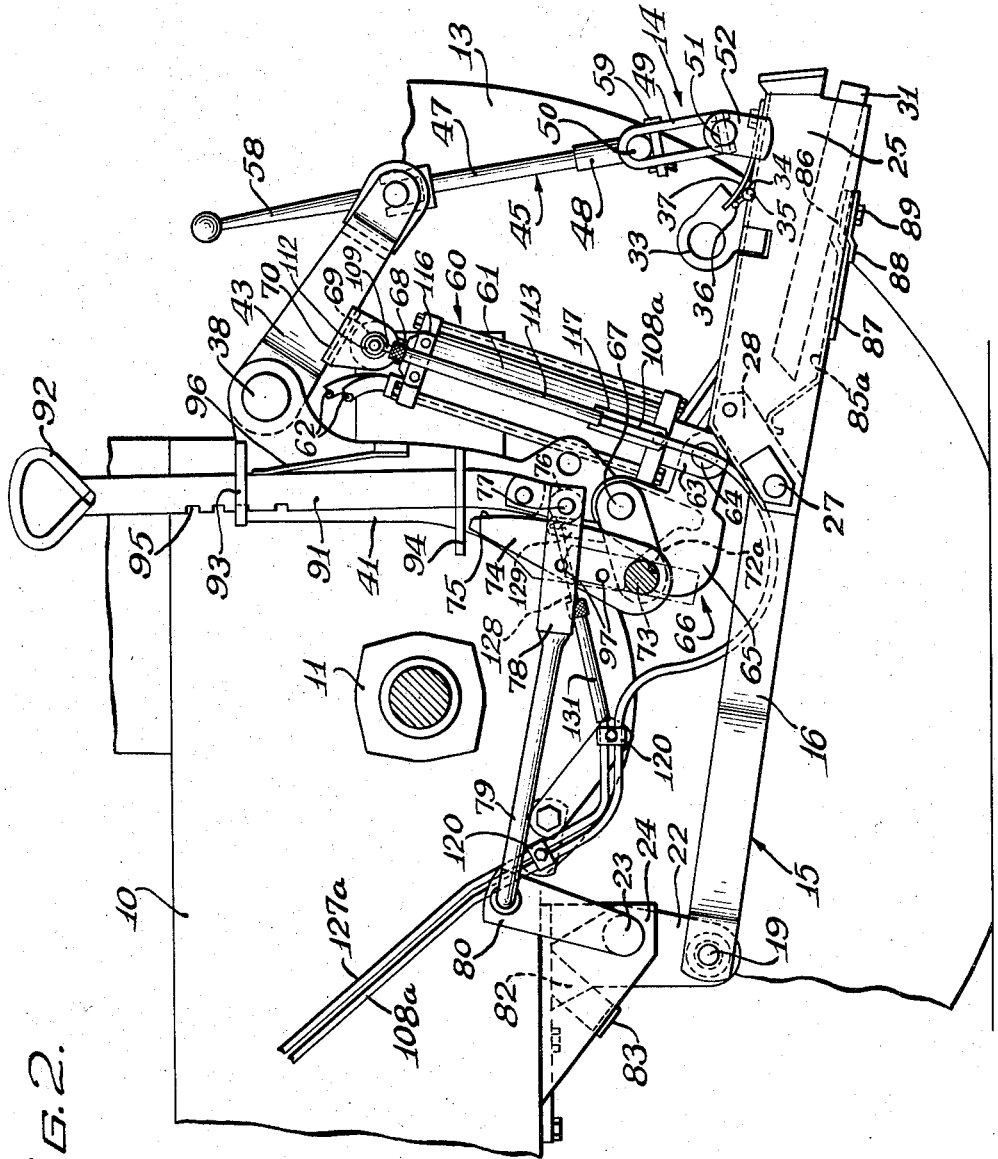
Figure 2 is a view in side elevation of the rear end of the tractor from the outer side thereof, with one wheel removed, and illustrating the position of the parts of the implement attaching and draft control apparatus together with the indicator control elements in a lowered or operating position.
Figure 3:
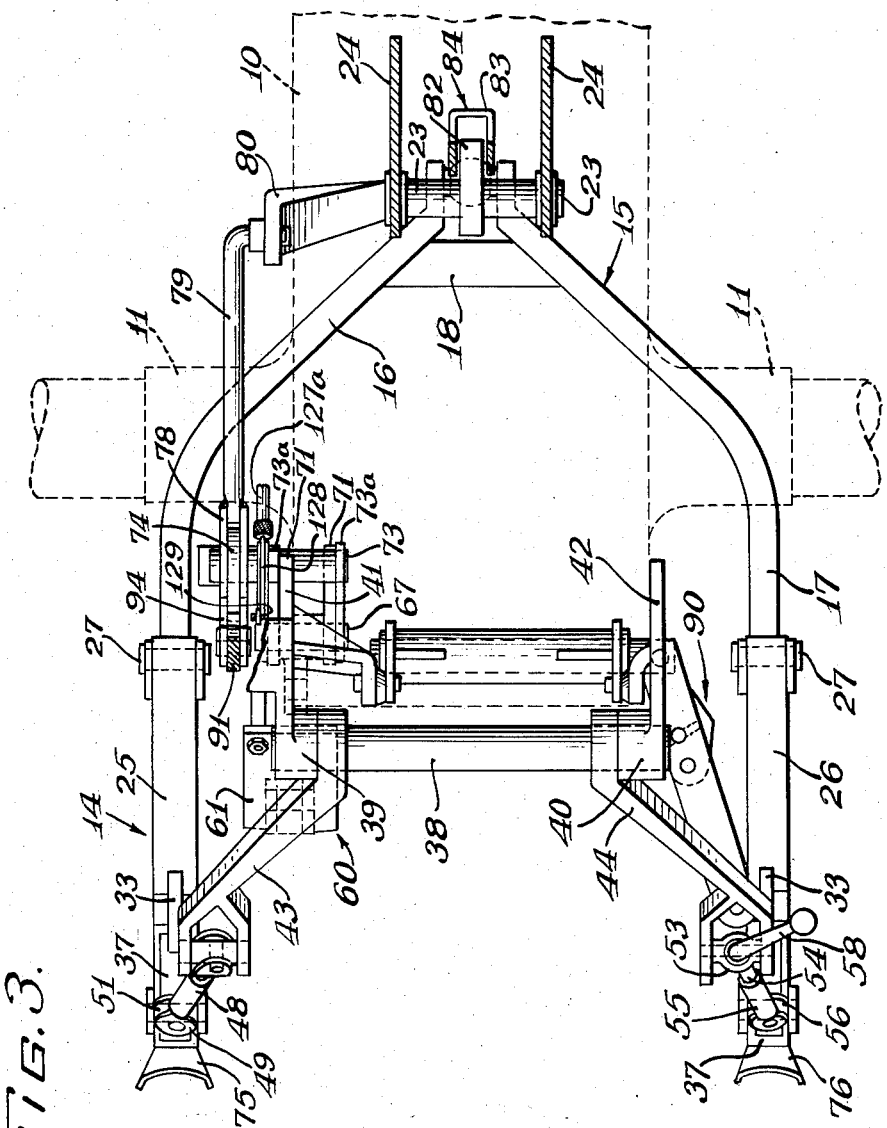
Figure 3 is a plan view, partly in section, of the implement attaching apparatus incorporating the invention, with the position of the tractor indicated in broken lines.

Raising and lowering of draft structure 14 to vertically move the implement connected thereto between operating and transport positions or to adjust the depth of the implement's operation, may be effected by means of power derived from the tractor power plant and transmitted by means of fluid under pressure supplied from a tractor power source (not shown), and delivered to a hydraulic ram 60. Said ram may include a cylinder 61 receiving fluid under pressure through hose lines 62, and having at its lower end a clevis 63 anchored to a pivot pin 64 carried at the end of one arm 65 of a rockable member or lever in the form of a bellcrank 66 fulcrumed upon a pivot pin 67 carried in a bearing 68 at the lower end of bracket 41. Admission of fluid under pressure to the cylinder 61, in the position of the parts indicated in Figure 2, extends piston rod 68 which is pivotally mounted upon a pin 69 carried between a pair of lugs 70 affixed to lift arm 43. Extension of the piston rod in the cylinder moves the implement attaching apparatus and therefore its connected implement from a lowered position such as is indicated in Figure 2 to the transport position indicated in Figure 1.

The structure of bellcrank 66, which is more particularly shown in Figure 8, resembles a bail and includes a pair of spaced plates 71 fixedly secured to a central connecting member which extends rearwardly and forms the arm 65. Said plates are apertured at 72 to receive the pivot pin 67, while the forward edges thereof are curved to form a recess as shown at 72a to disengageably receive the shaft 73 which has affixed thereto a lever arm 74 forming the other arm of the bellcrank 66. The shaft 73 is fixedly secured, as by welding or the like, to a pair of transversely spaced apart links 73a which are pivotally mounted at their opposite ends upon the pivot pin 67. As thus formed the bellcrank 66 is fashioned in separable and rotatable parts both of which are pivotable about the pivot pin 67. The lever arm 74 may pivot upwardly about the pin 67 without engaging the plate portions of bellcrank 66 but when said lever arm 74 pivots downwardly about pin 67 the shaft 73 engages the curved edges 72a of plates 71 and carries the remainder of said bellcrank with it about the pin 67. By a similar action the plate portions 71 may rotate rearwardly about the pin 67 separately from the lever arm 74, but when this portion rotates forwardly the curved edges thereof engage the shaft 73 causing it to rotate with its connecting links 73a about the pivot pin 67.

The rear edge of lever arm 74 is a curved camming surface 75 engaged by a block-like follower 76 mounted on a pin 77 carried at the end of a clevis 78 affixed at one end of a thrust rod 79, the forward end of which is bent laterally for reception in an opening provided in an arm 80 affixed to and projecting upwardly from shaft 23 and forming with hitch arm 22 a lever pivoted medially of its ends by which draft is transmitted to bellcrank 66. Thus, arms 22 and 80 constitute a lever fulcrumed in the middle thereof, and a rearward pull upon the draft member 14, due to excess draft encountered by the implement, causes the shaft 23 to rock in a counterclockwise direction as viewed in Figure 2, transmitting a forward thrust to rod 79, and acting through follower 76 as an abutment engaged by arm 74 to exert a force in a direction to rock the rockable member or bellcrank 66 in a counterclockwise direction about the axis of its fulcrum 67, as viewed in Figure 2. This rocking of the bellcrank 66 causes the hydraulic ram 60 to function as a thrust link and exert a force in an upward direction against the lift arm 43 and rockshaft 38 to lift the draft structure 14 and the implement connected thereto.

The effect of the implement encountering hard ground or an obstruction is illustrated schematically in Figs. 5, 6, and 7. The implement's own draft pull is thus utilized to exert a lifting effect thereon, the weight taken from the implement in this manner being transferred to the tractor by adding down pressure to the rear drive wheels and causing them to more aggressively engage the ground so that the full power of the tractor can be utilized to pull the implement through the ground. In Figure 5 the moldboard plow is shown in operation at a selected depth and the position of the implement attaching and draft control apparatus is illustrated therefor. In this instance, although the draft structure 14 is connected to the hitch arm 22 at a point in advance of the rear axle of the tractor and under the tractor body, a virtual hitch point is achieved at "A" rearwardly of the tractor rear axle and much closer to the plow bottom 81, the point "A" being a virtual hitch point for the plow determined by the intersection of a generally vertical line drawn through the pivotal connection of lift links 45 and 46 with their respective sockets 25 and 26 and lift arms 43 and 44, and a line drawn through the axes of pins 19 and 27. When excess draft is encountered by the implement, hitch arm 22 swings rearwardly, as indicated in Figures 6 and 7, about the axis of shaft 23, and arm 80 and thrust rod 79 move forwardly, rocking bellcrank 66 in a clockwise direction as viewed in Figures 5, 6 and 7. An upward thrust is exerted through the ram 60 against lift arms 43 and 44 to raise the implement, bail 15 swinging upwardly about its pivotal connection at 19, and sockets 25 and 26 pivoting about the axes 27 to a position such as indicated in Figures 6 and 7. The lifting force on the implement has been transferred to the tractor rear wheels causing a greater area thereof to engage the ground, off-setting somewhat the upward movement of the lift arms 43 and 44 and maintaining the plow bottom 81 at substantially the same operating depth.

Rearward swinging of the arm 22 and therefore rearward movement of the implement relative to the tractor under the influence of excessive draft forces is limited by the provision of a bumper or stop in the form of an upwardly projecting extension 82 on arm 22 engageable with the transverse portion 83 of yoke 84 affixed to the transverse portion 85 of bracket 24.

Sockets 25 and 26 are biased to a position in general alignment with the arms 16 and 17 of the forward section or bail 15 by the provision of a leaf spring 85a which has an offset section 86 engaging the under surface of bar 31 and held in place by a pair of spring sections 87 and 88 secured to spring 85a and base 31 by a bolt 89, the forward end of spring 85a being bent upwardly to engage extension 28. Thus, when the implement is detached from the tractor and the tractor operator wishes to back the tractor to the implement and cause the socket members 25 and 26 to slidably receive the shafts 29 of the implement, he elevates the socket by actuation of ram 60 to the proper elevation to receive the shafts and the springs 85a offset the tendency of the sockets to pivot about the axes of the pins 27, so that the sockets can be brought into a position which facilitates reception of the complementary shafts on the implement.

Figure 4:
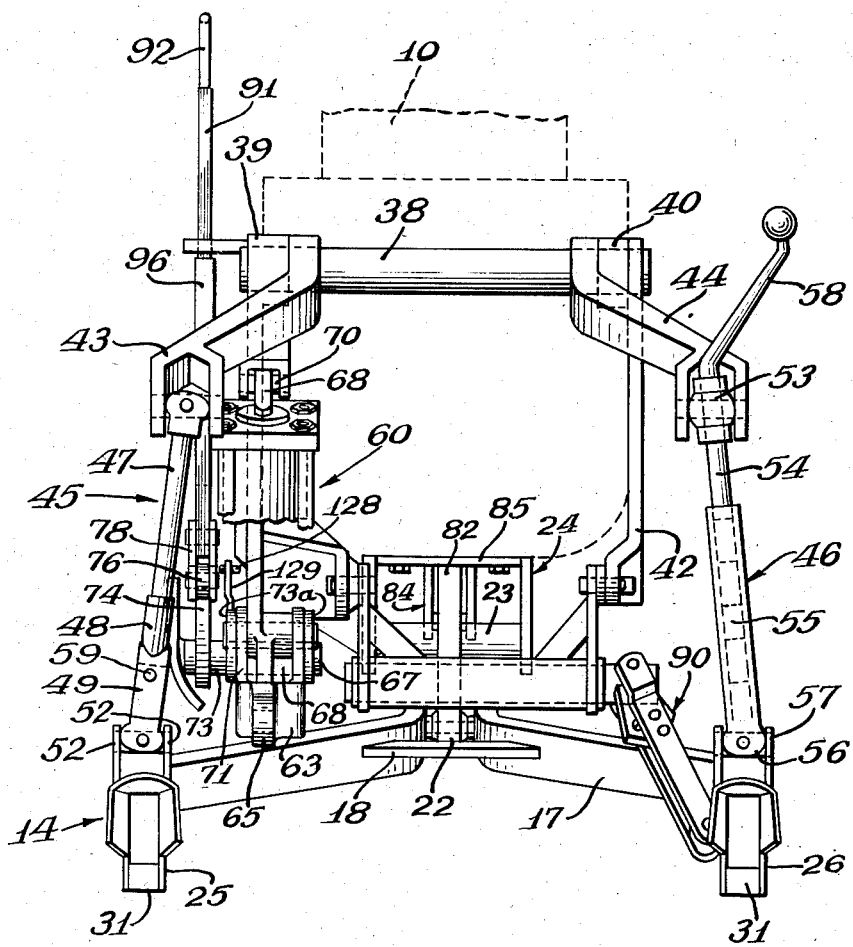
Figure 4 is an end elevation of the structure shown in Figure 3, with the position of the tractor also indicated in broken lines.

Limitation of lateral swinging of the implement attaching structure and the implement relative to the tractor is provided by stabilizing means generally indicated at 90 (Figure 4), forming no part of the present invention and described more particularly in the first of the copending applications referred to above.

The amount of weight it is desirable to transfer from the implement to the tractor varies with the soil, the operating depth of the implement, and other factors and, in terms of lifting effort, varies with the length of the lever arm represented by the contact of follower 76 with arm 74 on bellcrank 66. As previously noted, follower 76 is pivotally mounted at the end of clevis member 78 on pin 77, upon which is also mounted the lower bifurcated end of an adjusting member 91 having a handle 92 at its upper end accessible to the tractor operator. Adjuster 91 may be rectangular in section and is vertically slidably receivable in suitable slots (not shown) provided in vertically spaced brackets 93 and 94, mounted on bracket 41, for relative longitudinal movement therein. The forward edge of said adjuster is provided with a plurality of notches 95 and a leaf spring 96 secured at one end to the bracket 41 engages the rear edge of said adjuster to urge it toward the forward end of bracket 93 until the latter is received in a selected one of the notches 95. By moving the adjuster 91 up and down with respect to the brackets 93 and 94, the position of follower 76 with regard to lever arm 74 is varied, the rear edge 75 of lever arm 74 being in the form of a camming surface and the position of follower 76 with respect thereto, as shown in Figure 2, providing a longer lever arm and therefore a greater amount of weight transfer becomes available. Registering apertures 97 in arm 74 and clevis 78 make it possible to lock out the weight transfer mechanism when its function is not otherwise required.

Referring to Figures 5, 6 and 7 it will be noted that the moldboard plow illustrated maintains substantially the same operating depth in normal operation as when abnormal draft conditions are encountered. Although the lever 80 and thrust rod 79 and lever arm 74 will not normally be in relaxed condition while the implement is being propelled through the ground because of the pressure of the soil thereagainst. Figure 5 illustrates the approximate positions of the parts under average conditions. In Figure 5 the plow bottom is operating at a selected depth and the virtual hitch point is as indicated at "A." The rear section or socket member 26 is at an angle with respect to the bail section 15, having pivoted about the axis of pin 27, and the implement is capable of vertically floating movement to follow the contour of the ground by the sockets being separated from stop portion 28 of bail 15. This is made possible by the fact that lift arms 43 and 44 are pivotally mounted on shaft 38, and bellcrank 66 is free to rock in a clockwise direction, as viewed in Figures 5, 6 and 7 within the limits provided by the separable parts of said bellcrank, and by the slot in clevis 78 which receives the lever arm 74.

In Figure 6 the plow bottom 81 has encountered hard soil or has engaged an obstruction which causes it to move rearwardly with respect to the tractor and arms 22 and 80 and bellcrank 66 have been rocked to the positions shown and this motion has been transmitted through hydraulic ram 60 as a thrust link to lift arms 43 and 44 to exert a lifting effect on the implement. The effect of the lift imparted to the implement is to transfer the weight thereof to the tractor, the height of sockets 25 and 26 above the ground remains substantially the same, and the operating position of the plow bottom 81 remains substantially the same, and the added weight on the tractor drive wheels may be reflected by the digging of the rear drive wheels 12 deeper into the furrow. Hence, the depth of operation of said plow bottom remains substantially constant under all conditions, and the forces acting upon the plow bottom causing it to move rearwardly with respect to the tractor are converted into forces necessary to provide the required traction for the tractor drive wheels which permit it to continue pulling the implement through the soil.

Now in accordance with the more specific teaching of the present invention there are provided separately operable means for indicating depth of opeartion of the plow or other implement in the soil, and for indicating the balance being maintained between the effective weight of the implement employed and the draft forces encountered thereby, both of which means are operative through the lift means of the implement attaching mechanism.

The manifestations of depth of the implement in the soil, and of relative draft forces transmitted to the tractor are both indictable on an indicator type of gauge illustrated generally by the reference numeral 98. The proposed combination indicator gauge includes a casing or housing that is fashioned with a front panel portion 99 and a rear wall portion 100 detachably affixed thereto by suitable bolt and nut means such as those indicated by the numeral 101. The vertical and top edge portions of the front panel 99 may be flanged over as indicated to provide a reinforcing edge portion such as indicated at 102. The rear wall portion 100 is provided with a cross-section having side-by-side loop portions and resembles the letter W, as best seen in Figure 10, for a purpose that will presently be understood, while the edges of said rear wall portion are flanged outwardly to seat against the rear surface of said front panel. The front panel 99 is provided with a long elongated slotted opening 103 and a shorter similar opening 104 parallel thereto, and a scale 105 is inscribed or otherwise suitably positioned adjacent one edge of the long opening 103, while a scale 106 which includes only indicia or markings at opposite ends and one marking intermediate the ends thereof is provided adjacent the shorter opening 104. Scale 105, on the left as viewed in Figure 9, preferably, is calibrated to indicate vertical elevation or movement of the implement and, as illustrated, each marking can be translated into a prescribed depth of the implement in the soil, while scale 106 is arranged to represent only the relative amount of draft forces being transmitted through the implement attaching mechanism to the tractor without being calibrated to indicate any specifically established unit of measure. The slotted openings 103 and 104, it will be noted, are disposed one opposite each of the loops of the rear wall portion and thus provide conduit-like longitudinally extending channels 103a and 104a, respectively, behind said openings to slidably receive pointer or indexing units as will be explained.

A pointer or indexing member 107 is slidably positioned in the channel 103a and is adapted for movement along the slotted opening 103. The pointer 107 is fashioned with a block-like body 107a dimensioned to fit within the channel 103a but being slightly larger than the width of the slotted opening 103. Said block has an opening therein which receives a small diameter wire 108, of the well known Bowden type, and an arm 107b extending from the block is adapted to project through the slotted opening 103 and to slide therealong and to register with scale 105 adjacent thereto. A pair of collar members 107c, secured to the wire 108 on opposite sides of said block, are provided for suitably positioning the pointer on the wire, and providing for longitudinally adjusting the position of said pointer which is accomplished by movement of said collars along the wire.

Wire 108 is enclosed within a flexible but semi-rigid sheath-like conduit 108a fashioned of any suitable well-known plastic sheathing or covering material, and the opposite end of said wire is rigidly affixed to one end of a connecting rod 109 having a ring-like eyelet 110 on the opposite end thereof, which eyelet is adapted for positioning over a reduced end portion 111 of the pin 69, while suitable conventional means such as the cotter pin 112 may be provided for retaining said eyelet in position. A section of rigid conduit or tubing 113 fitted over the rod 109 and its attached wire 108 overlaps one end of the flexible conduit 108a, while a packing gland nut 114 threaded on the end of said rigid conduit may be provided for retaining any suitable well-known bushing or sealer, such as the packing material indicated at 115, therein. Affixed, as by welding or the like, proximate the opposite ends of the conduit 113 are strap fasteners 116 and 117 which serve together with the cap screws 118 and 119, respectively, to fixedly position said conduit on the cylinder housing of the ram 60. A plurality of clamps or fasteners, such as is illustrated at 120, may be provided for securing or mounting the flexible conduit 108a and its enclosed wire 108 to the tractor body as desired. A bracket 121 mounted on the tractor by bolt means 122 provides for mounting indicator 98, which device may be detachably affixed thereto by bolt and nut means 123. The end of the flexible conduit 108a is anchored rigidly against the rear surface of the indicator front panel 99 by a clamp 124, and the bolt and nut means 125.

The slotted opening 104 also has a pointer or indexing member, represented at 126, positioned therein and adapted for slidable movement therealong and for registration with the indicia or markings of scale 106. The pointer 126, which is fashioned similarly to that of pointer 107, includes a block-like body 126a with an opening therethrough and having an arm 126b extending outwardly therefrom that projects through the slotted opening 104 and slides therealong to register with scale 106. A small diameter wire 127, of the well known Bowden type, has one end thereof received in the opening in pointer body 126a and a pair of collars 126c, secured to the wire on opposite sides of said pointer block, are provided for suitably positioning the pointer on the wire, and longitudinal adjustment of the position of said pointer is accomplished by movement of said collars along the wire. The small diameter wire 127 is enclosed within a flexible but semi-rigid sheath-like conduit 127a fashioned of any suitable well known plastic sheathing or covering material, and the opposite end of said wire is affixed to one end of a slidable connecting rod 128 which has its opposite end bent over and positioned into an opening in an arm 129 that is fixedly secured to one of the link members 73a and with which it is rotatable about the pin 67. Suitable fastening means, such as the cotter pin 130, may be used to retain the bent over end portion of rod 128 in position to move with the arm 129. A section of rigid conduit or tubing, such as shown at 131, fits over the rod 128, which is slidable therewithin, and over one end of the flexible conduit 127a, while a gland nut 132 threaded on the rod end of said rigid conduit is provided to retain any suitable well-known bushing or sealer, such as the packing material shown at 115, therein. The flexible conduit 127a may also be fixedly secured at a plurality of points under the clamps 120, along with conduit 108a, and under the clamp 124 which serves to secure said flexible conduit assemblies to indicator 98 without restricting the slidable action of the respective wires therein.

The depth indicator portion of indicator 98 as arranged herein measures the amount of longitudinal movement of the piston of ram 60 and, since the depth of the attached implement in the soil bears a positive relation to said piston movement, it follows that the reading manifested on the indicator is indicative, even though not a direct measure thereof, of the depth at which the attached implement is being worked in the soil at a particular time. Since there is such variation in the dimensions of the various linkage, lift and attaching mechanisms as well as in the implements utilized therewith, it will be appreciated that the calibration of the depth indicator may vary for different implements and different vehicles. With the particular combination of equipment illustrated herein it was found that when the pointer 107 registered with the zero reading or setting on scale 105 the piston of ram 60 was fully extended and the plow bottom 81 was raised approximately fourteen inches (14") above the ground into its transport or carrying position. At the number one reading or setting the plow is approximately seven inches (7") above the ground and at the number two reading approximately three inches (3") above the ground. With the pointer at the number three reading the plow is substantially at ground level, at the number four reading the lowest part of the plow is approximately two inches (2") below the surface of the soil, at number five four inches (4") below, at number six six inches (6") below, at number seven eight to nine inches (8"–9") below and at the number eight reading from ten to twelve inches (10" to 12") below the surface. Thus, by knowing the correlation between the indicated reading on scale 105 and the actual depth of the implement, for any particular tractor and implement, the operator can readily determine substantially the actual depth in inches at which the implement is being employed at any given time.

Scale 106 which is provided for registering manifestations of the balance being maintained between the effective weight of the implement employed and the draft forces encountered thereby is arranged so that operating limits of the implement attaching and draft control mechanism are indicated, with a preferred intermediate operating position intermediate these limits interposed therebetween. Thus, by maintaining the pointer 126 between selected positions of the indicia on scale 106 the most effective weight transfer or traction control will be accomplished. As previously noted the pointer 126, being connected by way of the rigid wire 127 with the arm 129 of the weight transfer mechanism, follows the movements thereof, and, since the rotative movement of this arm is motivated by longitudinal movement of the implement, transmitted thereto through drawbar 14, hitch arm 22, arm 80, thrust rod 79, clevis 78 and lever arm 74 of the bellcrank 66, it will be appreciated that movement of the pointer 126 becomes indicative of longitudinal movement of the implement relative to the tractor. The amount of such movement thus becomes indicative of the magnitude of the draft forces encountered by the implement as it moves through the soil, and when these forces become excessive with respect to the weight of the implement the implement tends to be forced or urged rearwardly thus moving the attaching drawbar 14 longitudinally relative to the tractor and through the connecting linkage creating an upward lift on the implement as previously described.

It has been found that when such longitudinal movement of the implement remains within selected limits the most effective transfer of weight and thus traction control is accomplished. To physically limit the forward and rearward movements of the implement with respect to the tractor the stop mechanism 82—83 is provided. As previously described, this stop device is so arranged that when the implement is in its most forwardly position relative to the tractor the extension 82 on arm 22 is adapted to engage the tractor body 10 and thus prevent further forward movement of said implement, and when the implement is in its most rearwardly position extension 82 engages bracket arm 83 and thus prevents further rearward longitudinal movement of the implement. If the draft forces are such as to continue urging the implement rearwardly after the stop 83 is engaged then, unless compensated for by adjustment of the lever 91, the implement (in this instance plow bottom 81) will tend to rise above its preselected depth and cut a shallow furrow in the ground. The indicia on indicator scale 106 are coordinated with the stop positions of arm 22 and the top marking illustrated at, "R," of said scale is arranged to correspond with the rearwardmost position of the implement, and the bottom marking shown at "F" thereon corresponds with the forwardmost position of said implement, while a third marking shown at "I," which is intermediate said rear and forward indicia on the scale represents a medial longitudinal position of the implement. When the implement is in its forwardmost position, and the indicator pointer 126 is at the bottom of the scale 106, the pivot pin 64 will be at the lowermost point of its rotation and the bellcrank 66 will have been rotated clockwise (as viewed in Figure 2) as far as it can move.

It has also been found that when the draft forces are such as to cause pointer 126 to continually register between the bottom marking "F" and the intermediate marking "I" on said indicator the most effective operation of the attaching and draft control mechanism is attained, and, further, that when said pointer continually registers between the intermediate marking "I" and the top marking "R" the draft forces on the implement are excessive, and, unless adjustment thereof is made, as by movement of the lever arm 91 so as to change the effective lever arm of the bellcrank 66, loss of traction at the tractor wheels will occur. Hence, the operator by observing the movements and positions of pointer 126 on indicator scale 106 can readily determine any need for changing the amount of draft forces acting on the implement that are being transmitted through the attaching mechanism to the tractor, to increase or decrease traction of the wheels thereof. By raising or lowering handle 92 the position of contact of follower connection 76 on the cam surface of lever 74 is modified with the result that the proportion of draft forces transmitted to the tractor is increased or decreased accordingly. For instance, with handle 92 in the position shown in Figure 2 a large proportion of force transfer is being attained, and if, under this condition, reaction of the draft forces on the implement remain such as to urge the stop 82 into constant engagement with the tractor body and with pointer 126 remaining at the bottom of the scale 106, the operator would then know that the percentage of weight being transferred is not proper for most effective operation and that adjustment should be made. Accordingly, the operator would move the handle 92 up one notch whereupon drawbar 14 would tend to move rearwardly and thereby raise the pointer 126 to the "I" or intermediate marking on indicator scale 106. Now, continuing the operation further, so long as the pointer remains in the space between markings "F" and "I," except for momentary or short-lived surges therebyeond, a proper balance of forces is maintained with a suitable proportion thereof being transmitted to increase or decrease tractive effort as desired.

Consider now, for instance, that pointer 126 because of soil conditions encountered by the implement goes up above the "I" marker and remains for some time up near the "R" marker. This would indicate that the excessive draft forces acting on the implement are urging the implement to move longitudinally rearwardly, in turn, rotating the bellcrank 66 about the pin 67 and raising the ram 60 attached thereto with the result that the implement is lifted upwardly and is no longer able to remain at its prescribed operating depth in the soil. In this instance the operator would find it advisable to lower the handle 92 of the weight transfer mechanism one or more notches so as to produce the effect of increasing the force required at the drawbar to produce a vertical force at the ram's lower pivot point less than the weight of the implement and the suck of the plow (that is the vertical downward force exerted on the plow), thereby reducing the tendency of the implement to raise out of the soil. Hence, so long as the pointer 126 remains in the vicinity of the marker "I," or preferably slightly therebelow, the operator can be assured a proper balance is being maintained and the draft forces acting on the implement are not excessive for the particular conditions of operation, while deviation, for an appreciable length of time, from these markings will serve as a warning to the operator that adjustment of the handle 92 is necessary to compensate for the specific deviation noted.

With the proposed visual indicating device the operator has before him, at all times a reasonably true picture of how the implement is behaving, and whether or not it is being operated most effectively without having to guess or estimate the actual conditions of operation. Furthermore, the operator can also simultaneously determine, within practicable and permissible limits, the depth at which the implement is being operated in the soil.

It is believed that the operation of the proposed indicating device, as applied to the specific implement attaching mechanism, will be clearly understood from the foregoing description. It should likewise be understood, however, that the invention has been described in a preferred embodiment only and that modifications may be made in the invention without departing from the spirit thereof or the scope of the appended claims.

I claim:

1. In draft control means for an implement adapted for attachment to a tractor having lift means thereon and wherein longitudinal movement of the implement relative to the tractor in response to draft forces acting on the implement is transmitted to the implement lift means, and wherein a lever arm pivotally mounted on the tractor is operatively connected by a connecting rod with the implement while connecting means between said rod and said lever comprising an abutment carried by said rod frictionally engageable with one edge of said lever transmits motion of the rod thereto and means for shifting the radial position of said abutment relative to the fulcrum of said lever is operative to adjust the effective length of the latter so as to vary the amount of draft force acting on the implement that are transmitted through said lever to said lift means, the combination with an indicating device comprising, a scale having a plurality of indicia positioned thereon, said indicia being arranged so that the position of a first one thereof corresponds with the forwardmost position of movement of said connecting rod relative to the tractor, a second one corresponds with the rearwardmost position of the said connecting rod and a third one intermediate said first and second ones corresponds with a medial position of longitudinal movement of the said connecting rod, manifesting means adapted to move along and register with the indicia of said scale, means operatively connecting said manifesting means with the said lever for transmitting movement of said lever to the said manifesting means to indicate in cooperation with the indicia of said scale the relative amount of draft forces acting on the implement that are transmitted through the said lever to the lift means.

2. For use with implement attaching apparatus for a tractor wherein said apparatus includes implement-carrying draft means and a lift arm pivotally mounted on the tractor and operatively connected to the draft means for raising and lowering the latter and the implement upon swinging the lift arm, and wherein a longitudinally swingable lever mounted on the tractor is connected with the forward end of the draft means in draft-receiving relation for accommodating longitudinal movement of the implement relative to the tractor in response to draft forces acting on the implement while a bellcrank fulcrumed on the tractor has one arm thereof connected by link means to said lever for rocking the bellcrank by the swinging of said lever and a hydraulic ram connecting the other arm of the bellcrank to said lift arm for transmitting to the latter the swinging of said lever in response to draft forces acting on the implement, an indicating device adapted for mounting on the tractor comprising, means operatively connected to said bellcrank and operative for indicating longitudinal movement of the implement relative to the tractor in response to draft forces acting on the implement, and additional means operatively connected to said lift arm and operative for indicating movement of said lift arm relative to said hydraulic ram upon raising and lowering of said draft means independently of the operation and movement of said bellcrank.

3. For use with implement attaching apparatus for a tractor wherein said apparatus includes implement-carrying draft means and a lift arm pivotally mounted on the tractor and operatively connected to the draft means for raising and lowering the latter and the implement upon swinging the lift arm, and wherein a longitudinally swingable lever mounted on the tractor is connected with the forward end of the draft means in draft-receiving relation for accommodating longitudinal movement of the implement relative to the tractor in response to draft forces acting on the implement, while a bellcrank fulcrumed on the tractor has one arm thereof connected by link means to said lever for rocking the bellcrank by the swinging of said lever and a hydraulic ram connecting the other arm of the bellcrank to said lift arm for transmitting to the latter the swinging of said lever in response to draft forces acting on the implement, an indicating device adapted for mounting on the tractor comprising, a facing member having a plurality of indicia thereon, said indicia being arranged to correspond with various longitudinally spaced operating positions of the implement relative to the tractor and resulting from draft forces acting thereon, a pointer adapted to move in proximity to and register with the indicia of said facing member, means operatively connecting said pointer with the bellcrank of said attaching apparatus whereby rotational movements of the bellcrank are transmitted to said pointer for indicating in cooperation with said indicia the relative degree of draft forces acting on the implement that are transmitted through the bellcrank and the ram to the lift arm.

4. In draft control means for an implement adapted for attachment to a tractor having lift means thereon and wherein longitudinal movement of the implement relative to the tractor in response to draft forces acting on the implement is transmitted to the implement lift means, and a lever arm pivotally mounted on the tractor is operatively connected by a connecting rod with the implement while the connecting means between said rod and said lever comprises an abutment that is carried by said rod and is frictionally engageable with one edge of said lever to transmit motion of the rod thereto, and means for shifting the radial position of said abutment relative to the fulcrum of said lever is operative for adjusting the effective length of the latter and varying the amount of draft force transmitted to said lift means, the combination with an indicating device adapted for mounting on a tractor, comprising, a scale having a plurality of indicia thereon, said indicia being positioned to correspond with the extreme and intermediate positions of longitudinal travel relative to the tractor of the connecting rod of the draft control means, pointer means adapted to move along and register with the indicia of said scale, means flexibly connecting said pointer with the said lever of the draft control means for transmitting movement relative to the tractor of said lever to said pointer, said pointer being cooperative with said scale to indicate the relative amount of draft forces acting on the implement that are transmitted through the said lever to the lift means.

References Cited in the file of this patent

UNITED STATES PATENTS

| 2,154,503 | French et al. | Apr. 18, 1939 |
| 2,462,641 | Hyland | Feb. 22, 1949 |
| 2,626,551 | Starr | Jan. 27, 1953 |
| 2,654,339 | Sperling | Oct. 6, 1953 |
| 2,785,616 | Jones | Mar. 19, 1957 |

FOREIGN PATENTS

| 54,944 | Netherlands | July 15, 1943 |